United States Patent [19]

Hester

[11] Patent Number: 4,645,222

[45] Date of Patent: Feb. 24, 1987

[54] VEHICLE AND METHOD OF OPERATING SAME

[76] Inventor: Robert Hester, "Gretwyn" Haughton Drive, Shifnal, Shropshire, England, TF11 8HF

[21] Appl. No.: 731,110

[22] PCT Filed: Mar. 28, 1984

[86] PCT No.: PCT/GB84/00103

§ 371 Date: May 6, 1985

§ 102(e) Date: May 6, 1985

[87] PCT Pub. No.: WO85/01206

PCT Pub. Date: Mar. 28, 1985

[51] Int. Cl.[4] .......... B62B 9/06

[52] U.S. Cl. .......... 280/5.26; 180/8.2

[58] Field of Search .......... 280/5.26, 5.2, 5.28, 280/DIG. 10, 5.24; 180/8.2, 907

[56] References Cited

U.S. PATENT DOCUMENTS 3,196,970 7/1965 Brenner .......... 280/DIG. 10
3,241,848 3/1966 Flory .......... 280/5.26
3,283,839 11/1966 Brown .......... 280/5.26

FOREIGN PATENT DOCUMENTS 2165452 7/1973 Fed. Rep. of Germany .......... 280/5.2
2126540 3/1984 United Kingdom .......... 280/5.28

*Primary Examiner*—John J. Love
*Assistant Examiner*—Mark C. Dukes
*Attorney, Agent, or Firm*—Parmelee, Miller, Welsh & Kratz

[57] ABSTRACT

A wheelchair capable of climbing a flight of steps has a cluster of rear wheels rotatably mounted on a member (19) which can pivot on a body (10) of the chair to move the rear wheels upwardly and downwardly and thereby compensate for differences in the levels of the surfaces on which the rear wheels and front wheels of the chair rest. The member (19) is pivoted automatically in accordance with differences between the rotation of front and rear drive elements.

7 Claims, 7 Drawing Figures

VEHICLE AND METHOD OF OPERATING SAME

From a first aspect the present invention relates to a method of operating a vehicle to climb a flight of steps, the vehicle comprising a load-carrying body provided with front and rear wheel assemblies, wherein one of said wheel assemblies is moved onto a tread of the lowest step of said flight and the positional relation between the wheel assemblies and the body is varied to compensate for the upward movement of the one wheel assembly and to maintain the attitude of the body substantially constant.

According to a second aspect of the invention, there is provided a vehicle comprising a load-carrying body provided with front and rear wheel assemblies, wherein one of the wheel assemblies is movable upwardly and downwardly relative to the body and other wheel assembly whilst the attitude of the body remains substantially unchanged and is such that both wheel assemblies could rest on a horizontal plane, the permitted upward movement of the one wheel assembly relative to the body from the horizontal plane being at least 150 mm.

Upward movement of one wheel assembly relative to the other through a distance of 150 mm is sufficient to maintain the body substantially horizontal when the other wheel assembly moves down a moderate step.

The invention has been devised primarily in relation to a vehicle which is a wheelchair. However, the invention may be applied to other wheeled vehicles where analogous features can be used.

In GB Pat. No. 1,430,714, there is disclosed a load-carrying cart having a pair of rear wheels rotatable about an axis which is fixed with respect to a body of the cart and a pair of front wheels rotatable about an axis which can be moved relative to the body. The cart is intended to be used for carrying loads up and down flights of stairs. The front wheels are mounted on an arm which pivots with respect to the body. However, the cart is so designed that a load-carrying platform which is horizontal, when the cart runs on a horizontal floor surface, is steeply inclined to the horizontal when the cart moves up a flight of stairs. The front wheels are mounted on an arm pivoted to the body for movement along an approximately horizontal path when the load-carrying surface of the body is horizontal.

The present invention provides a vehicle in which a load-carrying surface which is horizontal in normal use on a horizontal floor can remain horizontal during ascent of or descent of at least some flights of stairs.

According to a third aspect of the invention, there is provided a wheelchair comprising a seat and front and rear wheel assemblies wherein one of said assemblies is movable upwardly and downwardly relative to the seat when the seat is in the normal attitude of use and there is provided control means for controlling upward and downward movement of said one assembly in accordance with the relation between rotation of an element of the front wheel assembly and rotation of an element of the rear wheel assembly.

When the wheelchair travels along level ground, said elements of the front and rear wheel assemblies may rotate at the same speed. If one of the wheel assemblies then travels down a step whilst the other wheel assembly moves a relatively short distance along the level ground, one of said elements will rotate at a higher speed than the other during movement of the one wheel assembly down the step and this change in the relative speeds of the elements is used to control relative movement of the seat and other wheel assembly so that the attitude of the seat remains approximately constant. Alternatively, the relative movement may be controlled by the user.

Said one assembly may be movable along a predetermined path relative to the seat, the relation between the path and the seat being such that, when the seat is in the normal attitude of use, movement of said one assembly in one direction along the path can be resolved into an upward component and a horizontal component away from the other wheel assembly and movement in the opposite direction along the path can be resolved into a downward component and a horizontal component towards the other wheel assembly. With this arrangement, the effective wheel base of the wheelchair is extended when the one assembly moves upwardly relative to the seat.

The front and rear wheel assemblies are preferably both restrained against turning about upright axes.

The wheelchair may include a further wheel assembly comprising a wheel which can turn about an upright axis and which can be moved upwardly and downwardly relative to an adjacent one of the front and rear wheel assemblies. The wheel of the further wheel assembly is preferably free to turn about its upright axis. Two such further wheel assemblies could be provided.

The further wheel assembly may be provided with means for restraining rotation of a carrier of an adjacent one of the front and rear wheel assemblies when the further wheel assembly is lowered relative to said one of the front and rear wheel assemblies.

According to a fourth aspect of the invention, there is provided a method of operating a wheelchair comprising a seat and front and rear wheel assemblies wherein, as the wheelchair commences to ascend or descend a step or flight of steps, one of the wheel assemblies is moved upwardly or downwardly relative to the seat, as appropriate to maintain the seat, when the one wheel assembly rests on a surface which is at a level substantially different from a surface on which the other wheel assembly rests, at least approximately in its normal attitude of use.

According to a fifth aspect of the invention, there is provided a wheelchair comprising a seat, a backrest, front and rear wheel assemblies and a frame connecting together the wheel assemblies, the seat and the backrest, wherein the frame includes first and second parts connected for relative pivoting, the first frame part carries a front part of the seat and the second frame part carries a rear part of the seat and the backrest.

The first and second frame parts are preferably pivotable relative to each other about an axis which normally lies below the seat and is spaced substantially from the backrest in a direction towards a front margin of the seat.

The front and rear wheel assemblies also may be arranged for pivoting relative to the first part of the frame between respective positions which they occupy during use of the wheelchair and positions which they occupy when the wheelchair is folded for transport or storage.

The front and rear wheel assemblies may move relative to the first part of the frame about respective axes which are parallel to the axis about which the second frame part moves relative to the first part of the frame.

An example of a wheelchair embodying the second and third aspects of the invention and which is used in a method according to the first aspect will now be described, with reference to the accompanying drawings, wherein.

Figure 1:
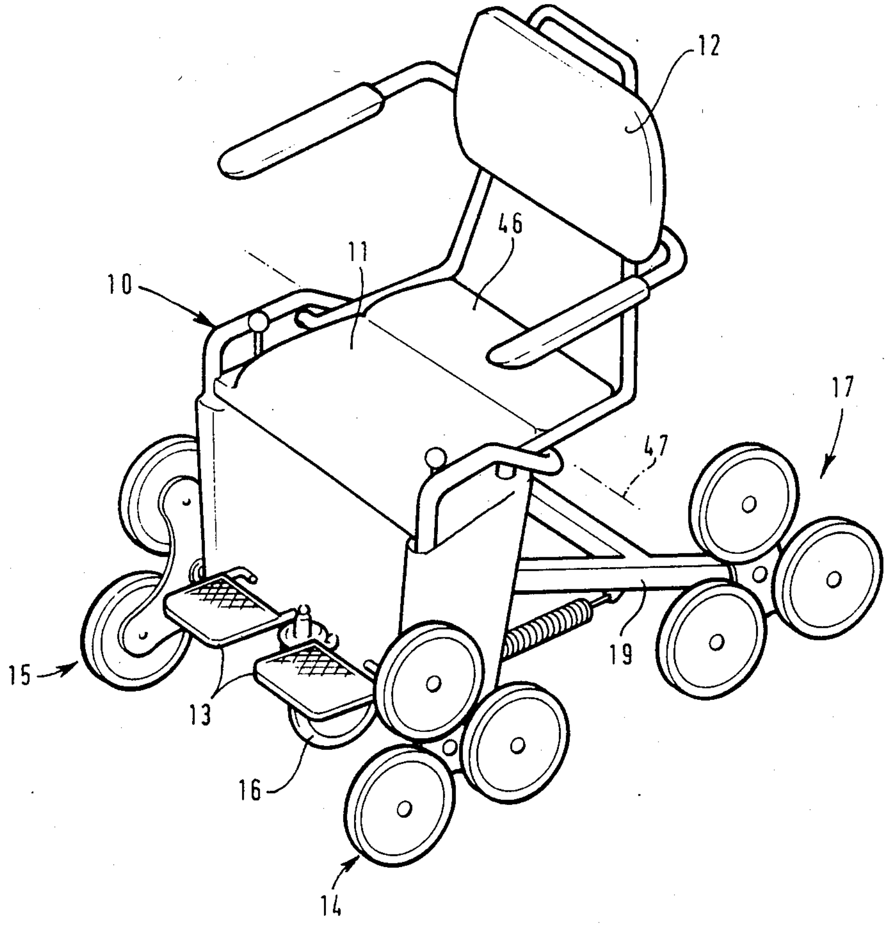
FIG. 1 shows diagrammatically a perspective view of the wheelchair.
Figure 2:
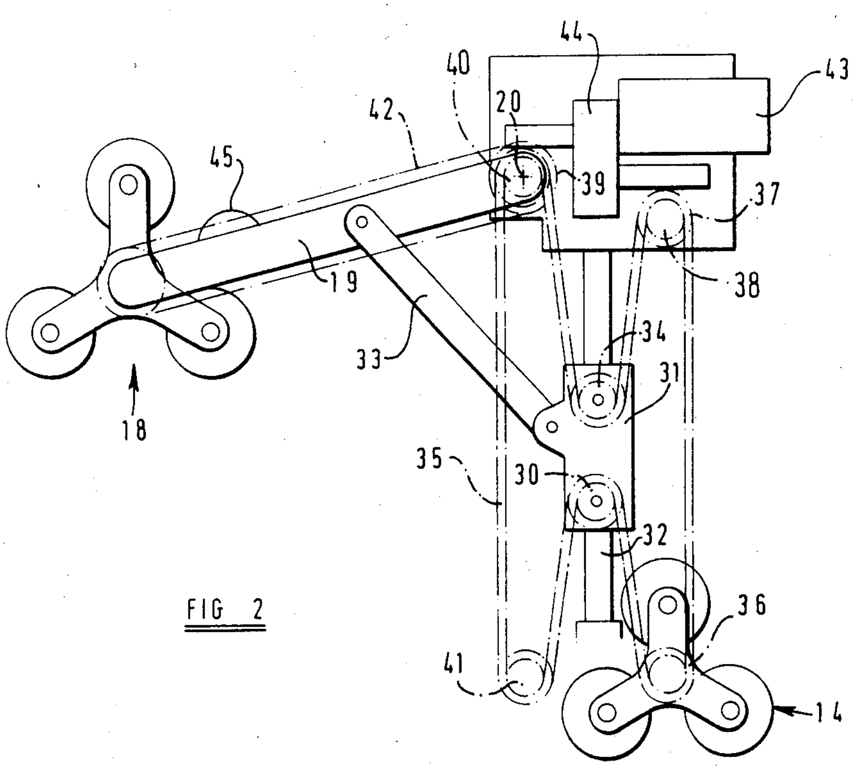
FIG. 2 shows diagrammatically certain parts of the wheelchair, as seen from one side.

The wheelchair illustrated in the drawings includes a load-supporting body 10 which includes a seat 11, a backrest 12 and foot rests 13. The wheelchair further comprises a pair of front wheel assemblies 14 and 15 disposed one adjacent to each side of the body 10. At an intermediate position, there is mounted on the body a castor 16 which can be raised and lowered relative to the body 10 and the front wheel assemblies 14 and 15 by means of a handle and a screw and nut mechanism (not shown). The wheelchair further comprises a pair of rear wheel assemblies 17 and 18 mounted on a common member 19 for movement upwardly and downwardly relative to the body 10. The member 19 is connected with the body for pivoting relative thereto about an axis 20 which lies just below the seat 11 and above the front wheel assemblies 14 and 15.

Figure 3:
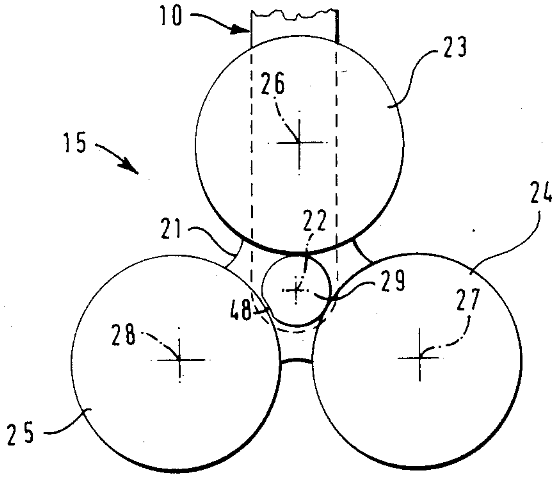
FIG. 3 shows on an enlarged scale a front wheel assembly omitted from FIG. 2.

The front wheel assembly 15 includes a carrier 21 mounted for unlimited rotation relative to the body 10 about an axis 22 which is common to the front wheel assemblies and is parallel to the axis 20. A plurality of wheels, three in the example illustrated, is mounted on the carrier 21 for rotation relative thereto about respective axes which are spaced apart and from the axis 22 and are parallel to the axis 22. In FIG. 3, the wheels on the carrier 21 are identified by the reference numerals 23, 24 and 25 and their axes are indicated by the reference numerals 26, 27 and 28 respectively. These axes are spaced 100 mm to 150 mm from the axis 22. There is positioned between the wheels 23, 24 and 25 a brake element 29 which is a sector of a body of revolution, preferably of a cylinder. The brake element is omitted from FIG. 1 but shown in FIG. 3. The axis of curvature of the element 29 coincides with the axis 22 of the carrier. The brake element is supported in the centre of the carrier by a bearing which provides for rotation of the carrier relative to the brake element. The brake element is connected with the body 10 by a linkage (not shown) which normally restrains rotation of the brake element relative to the body about the axis 20 but which enables the brake element to be adjusted angularly about that axis relative to the body within a predetermined range, for example 45°.

The front wheel assembly 14 is constructed and arranged in the same manner as the wheel assembly 15. The brake elements of the wheel assemblies 14 and 15 may be connected with the body 10 by a common linkage which ensures that the brake elements undergo the same angular adjustment.

Each of the rear wheel assemblies 17 and 18 comprises a plurality of wheels, three in the example illustrated, and a carrier arranged in the same manner as the wheels and carrier of the wheel assembly 15. However, the rear wheel assemblies do not have brake elements corresponding to the element 29.

Control means is provided for controlling pivoting of the member 19 relative to the body 10 according to the relation between rotation of the carriers of the front wheel assemblies 14 and 15 and rotation of the carriers of the rear wheel assemblies 17 and 18. The control means includes a rotatable control element in the form of a sprocket 30 connected by a linkage with the member 19. This linkage comprises a slide 31 which is slidable upwardly and downwardly on a guide 32 fixed to the body 10 and a link 33 extending between and pivotally connected with the member 19 and the slide 31. The sprocket 30 is mounted on the slide 31 for rotation relative thereto about an axis parallel to the axis 20. A further sprocket 34 also is similarly mounted on the slide.

The control means further comprises an endless flexible element in the form of a chain 35 which extends from the sprocket 30 around a sprocket 36 fixed on the carrier 21, then around a sprocket 37 on a front drive shaft 38, around the sprocket 34, around a sprocket 39 on a rear drive shaft 40, around an idler sprocket 41 on the body 10 and then back to the sprocket 30. The rear drive shaft 40 is mounted for rotation relative to the body 10 about the axis 20 and the front drive shaft 38 is mounted for rotation relative to the body about an axis parallel to the axis 20 and spaced somewhat forwardly therefrom. The front drive shaft lies above the axis 22 of the front wheel assemblies and the idler sprocket 41 lies to the rear of that axis.

A further endless flexible element in the form of a chain 42 extends around a further sprocket on the rear drive shaft 40 and around a sprocket which is fast with the carrier of the rear wheel assembly 18. The drive chains and sprockets are duplicated on the other side of the wheelchair, so that the carriers of the two rear wheel assemblies are caused to rotate together at a speed which bears a fixed relation to the speed of the rear drive shaft 40, provided the member 19 does not turn about the axis 20. The carriers of the front wheel assemblies 14 and 15 also are caused to rotate together at a speed which bears a fixed relation to the speed of the front drive shaft 38.

Drive means including an electric motor 43 and a gearbox 44 is provided for driving the front drive shaft 38 and the rear drive shaft 40 together or independently of one another, as required. The motor 43 is used for ascending or descending a step or a flight of steps but is not used for driving the wheelchair along level ground. The drive means comprises a further motor 45 connected by suitable drive means with the wheels of the rear wheel assemblies 17 and 18. This drive means may include a belt or chain which extends around pulleys or sprockets fixed with respect to the wheels or may include a gear train. Alternatively, a combination of a gear train and belt and pulley drive may be provided for transmitting torque from the motor 45 to the wheels of the rear wheel assemblies. Generally, one wheel of each rear wheel assembly will run on the ground and the other two wheels of each rear wheel assembly will idle. Thus, substantial torque will be transmitted to only one wheel of each rear wheel assembly. Separate drive belts may be provided for the three wheels of each rear wheel assembly, or a common drive belt may be provided. In place of a belt, there may be used a chain and reference is herein to a drive belt should be construed accordingly. The motor 45 can be energised independently of the motor 43.

Figure 4:
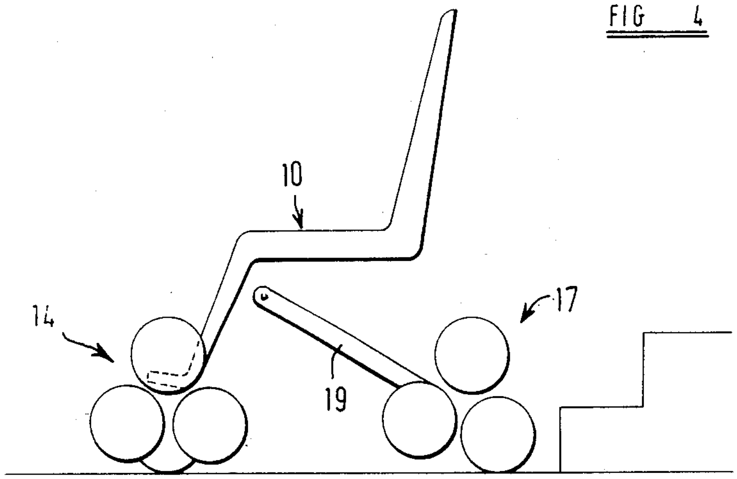
FIGS. 4 to 7 represent diagrammatically configurations of the wheelchair assumed under different circumstances.
Figure 5:
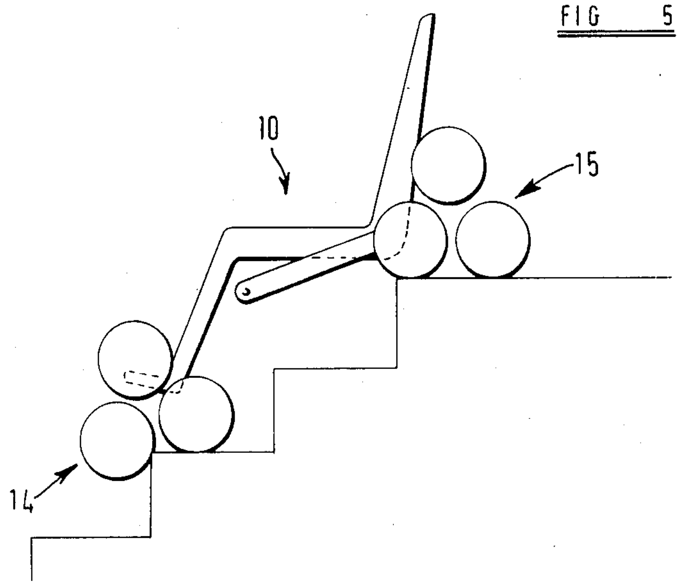
Figure 6:
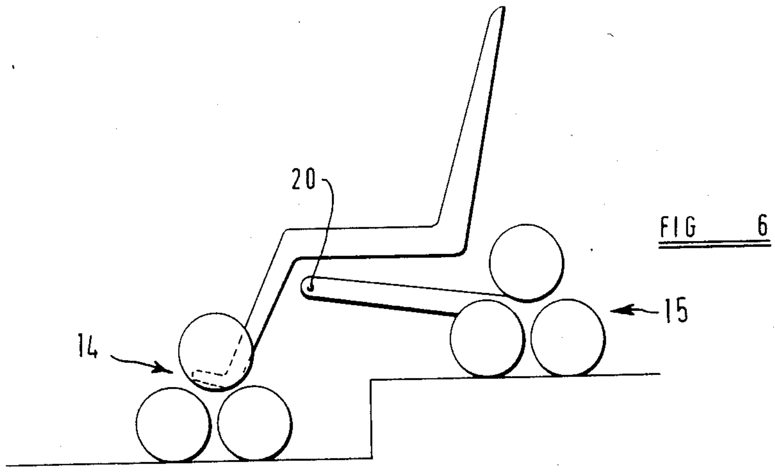

For travel of the wheelchair on a level surface, the castor 16 projects downwardly below the wheels of the front wheel assemblies 14 and 15 so that the wheels of the latter are clear of the ground. The wheelchair is driven by the motor 45. For steering of the wheelchair, there may be provided a known mechanism for causing differential rotation of wheels of the rear wheel assemblies. When a flight of steps is to be ascended, the wheelchair is positioned with the rear wheel assemblies near to the lowest step, as shown in FIG. 4. The castor 16 is raised relative to the body 10 so that the wheels of the front wheel assemblies 14 and 15 rest on the ground. The motor 45 is de-energised so that this motor acts as a brake, restraining rotation of the wheels of the rear wheel assemblies unless turning of the carriers of the wheel assemblies occurs.

The motor 43 is energised to drive the rear drive shaft 40 only. This drive shaft is driven in a direction to draw the chain 35 in a direction from the sprocket 34 and to pass chain around the idler 41 towards the sprocket 30. The length of chain between the rear drive shaft and the sprocket 34 is reduced, so that the slide 31 is drawn up the guide 32. This motion is transmitted by the link 33 to the member 19 which is therefore pivoted upwardly relative to the body 10. In this way, the rear wheel assemblies 17 and 18 are raised relative to the body 10 and the front wheel assemblies. Rotation of the rear drive shaft also causes the carrier of each rear wheel assembly to turn about the axis of that wheel which is adjacent to the lowest step and in a direction to move the uppermost of the rear wheels towards the tread of the first step. This wheel moves onto the tread of the first step and, if driving of the rear shaft is continued, the carrier of the rear wheel assembly then turns about the axis of this wheel to move the third wheel onto the tread of the second step. As the rear wheel assemblies move upwardly to the tread of a step, whilst the front wheel assemblies are on a horizontal surface spaced away from the steps and the front drive shaft is not driven, there is no substantial movement of the chain 35 around the sprockets 36 and 37. Accordingly, the rear wheel assemblies are automatically raised relative to the body 10 and front wheel assemblies so that the attitude of the seat 11 is not changed significantly.

Prior to ascent of the steps, the brake elements 29 are adjusted so that the flat surface 48 of each element is inclined to the horizontal and faces somewhat rearwardly. When wheels of the rear wheel assemblies have reached the tread of the second step, the gearbox 44 is adjusted to transmit drive from the motor 43 to both of the drive shafts 38 and 40. Whilst both drive shafts are driven by the motor, the slide 31 remains in the position to which it has been set and movement of the member 19 relative to the body 10 is prevented. Each carrier of the wheelchair is moved around the axis of a wheel on that carrier, the wheel bearing against adjacent surfaces of a tread and a riser. Each wheel of the front wheel assemblies is braked as it moves through an arc lying generally above the axis 22. When each of these wheels moves through an arc adjacent to the flat 48 of the brake element 29 and lying below and rearwardly of the axis 22, the wheel is unbraked and the associated carrier can turn about the axis of that wheel without the wheel itself participating in the motion. Alternatively, the wheel may be subjected to a predetermined braking torque, rather than being completely unbraked.

When the wheels of the rear wheel assemblies 17 and 18 have reached the top of the flight of steps, drive to the rear drive shaft is discontinued and is continued to the front drive shaft. The front wheel assemblies continue to climb the steps and the slide 31 is driven down the guide 32, thereby returning the member 19 to its initial position and lowering the rear wheel assemblies relative to the body 10. The attitude of the seat 11 remains substantially unchanged throughout the procedure.

In a case where a single step is to be climbed, a similar procedure is followed but the member 19 is pivoted upwardly through a smaller angle, again to maintain the seat substantially horizontal.

Figure 7:
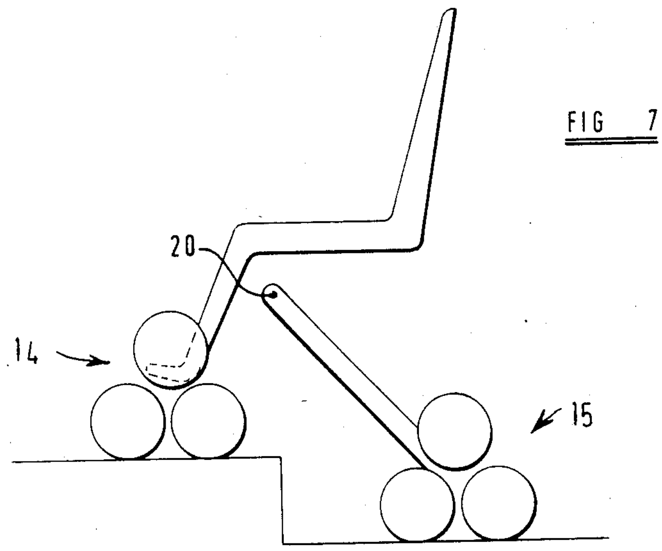

It is envisaged that the chair may be used to climb a step forwardly, as illustrated in FIG. 7. In this case, the front drive shaft alone is driven initially to cause the front wheel assembly to climb the step and to cause the member 19 concurrently to pivot downwardly, thereby lowering the rear wheel assemblies. When the rear wheel assemblies reach the riser, drive of the front drive shaft is discontinued and the rear drive shaft is driven to cause the rear wheel assemblies to climb the step and to cause the member 19 to pivot upwardly to its initial position with respect to the body 10.

For descent of a flight of steps, the wheelchair is brought to rest with the front wheel assemblies close to the uppermost step. The brake elements 29 are adjusted so that the flat surfaces 48 thereof are horizontal and face downwardly. The front drive shaft 38 alone is then driven to cause the front wheel assemblies to roll down the first and second steps. Concurrently, the member 19 is pivoted upwardly to raise the rear wheel assemblies relative to the body 10 and thereby maintain the seat 11 horizontal. When the front wheel assemblies have descended two steps, drive is applied to both the front and rear drive shafts and descent of the steps is continued. The action of the brake element 29 ensures that each wheel of the front wheel assemblies rolls down a riser onto a tread of the steps and then remains close to that riser whilst the associated carrier moves about the axis of that wheel to bring a further wheel into contact with the next lowermost riser.

When the front wheel assemblies have reached the bottom of the flight of steps, drive to the front drive shaft is discontinued. Driving of the rear drive shaft then causes the rear wheel assemblies to complete descent of the steps and causes the member 19 to pivot downwardly relative to the body 10 so that the seat remains horizontal. Once all of the wheel assemblies have reached the bottom of the flight of steps, energisation of the motor 43 is terminated, the castor 16 is lowered to raise the front wheel assemblies from the ground and the motor 45 is energised to drive the wheelchair away from the steps.

The motors 43 and 45 may be energised from batteries (not shown) mounted on the body 10 and partly occupying the space between the rear wheel assemblies. If required, separate motors may be provided for driving the front and rear shafts. Alternatively, a single motor may be provided for driving the wheelchair during normal travel and for driving the front and rear shafts. There may be provided on the body 10 limit switches which respond to pivoting of the member 19 by providing signals which adjust the gearbox 44.

It will be understood that reference herein to the seat 11 remaining horizontal do not mean that in all cases the seat will be precisely horizontal. Differences in the relation between the size of risers and treads of different steps will result in minor differences in the attitude of the seat as steps are ascended or descended but these differences will not be sufficient to impair significantly stability of the wheelchair or the comfort of the occupant. The vertical component of the permitted movement of the rear wheel assemblies relative to the body 10 is at least 150 mm and is preferably at least 300 mm.

It will be noted that, when the wheels of the front wheel assemblies and the wheels of the rear wheel assemblies are rolling on horizontal surfaces, upwards and downwards adjustment of the rear wheel assemblies is prevented by the control means.

The member 19 may be biased with respect to the body 10 to a predetermined position intermediate the positions to which it can be pivoted. The biasing means may comprise a spring acting between the member 19 and the body 10. When the member is in this predetermined position, the front and rear wheel assemblies can support the wheelchair on a horizontal surface with the seat 11 substantially horizontal.

When the wheelchair is ascending a flight of steps, each wheel is moved into contact with a corresponding tread of the steps with the axis of that wheel approximately vertically above the point of first contact between the wheel and the tread.

The backrest 12 and a rear part 46 of the seat can pivot together relative to the seat part 11 and body 10 between the erected position shown in FIG. 1 and a folded position in which the backrest lies adjacent to the foot rests 13. These also can be folded relative to the body 10. The axis 47 about which the backrest can be folded lies just below the level of and to the rear of the seat part 11 and is parallel to the axis 20.

Although, in the example illustrated, the castor 16 is disposed between the front wheel assemblies 14 and 15, the castor could alternatively be positioned near to the rear of the wheelchair. Furthermore, instead of the castor wheel being freely pivotable about a vertical axis, pivoting about this axis may be controlled for steering of the wheelchair. The wheelchair may include a steering control operable by the user to pivot the wheel about its vertical axis.

In a case where pivoting of the wheel 16 about its vertical axis is controlled by a steering control, means may be provided for driving the wheel, as an alternative to driving the rear wheel assemblies when the wheelchair is travelling along the horizontal surface. The means for driving the wheel will include a motor and a transmission train for transmitting torque from the motor to the wheel. Preferably, the transmission train includes a telescopic, generally upright shaft and the steering control also includes a telescopic, parallel shaft, the wheel 16 being carried on an axle which can be moved upwardly and downwardly relative to the front wheel assemblies so that the front wheel assemblies can be lifted clear of the ground when the wheelchair is to run of the wheel 16 and can be lowered to the ground when the wheel 16 is to be clear of the ground and the wheelchair is to run on the front wheel assemblies. A sliding carrier may be provided on the frame for moving the wheel 16 upwardly and downwardly.

There may be provided means for transmitting limited torque from the motor 45 to the wheels of the rear wheel assemblies 17 and 18 to drive these wheels in the reverse direction when conditions are such that a limited torque will cause rotation of these wheels. Driving of the wheels of the rear wheel assemblies in this manner is useful during the climbing of a flight of steps, since the rear assemblies will be driven to the riser of each step. However, the limited torque transmitted from the motor 45 would be insufficient to cause the rear wheel assemblies to climb a riser.

Drive from the motor 43 to each of the shafts 38 and 40 may be through a respective clutch and associated gearbox. Thus, the user can select either of the shafts to be driven by the motor. Furthermore, the wheelchair may comprise a single motor, clutches being provided for transmitting drive selectively to the front drive shaft, to the rear drive shaft and to a driven wheel or to driven wheels. There may be associated with each clutch a gearbox.

If the invention is applied to a vehicle other than a wheelchair, there would be provided in place of the seat a load platform. Features hereinbefore mentioned as optional features of the wheelchair may be incorporated in such a vehicle.

I claim:

1. A wheelchair comprising a seat and front and rear wheel assemblies for supporting the seat wherein each said assembly comprises a respective spider and a plurality of wheels rotatably mounted on the spider, one of said assemblies is movable upwardly and downwardly relative to the seat when the seat is in the normal attitude of use, each of said spiders is mounted for rotation relative to the seat about a respective axis, there is provided control means including a control element displaceable relative to the seat and a linkage for transmitting displacement between the control element and the one wheel assembly and wherein the wheelchair includes a single drive means for simultaneously driving the spiders and the control element, said drive means providing a driving connection between the spiders and the control element whereby displacement of the control element relative to the seat is dependant on the relation between rotation of the spider of said front assembly and rotation of the spider of said rear assembly.

2. A wheelchair according to claim 1 wherein said rear wheel assembly is pivoted relative to the seat for movement about an axis which is above the level of the front wheel assembly when the wheelchair is in the normal attitude of use.

3. A wheelchair according to claim 1 wherein guide means is provided for guiding the control element for displacement along a predetermined path relative to the seat and wherein said drive means is arranged for driving the control element along said path.

4. A wheelchair according to claim 1 comprising a further wheel assembly including a wheel which can turn about a generally upright axis and which can be moved upwardly and downwardly relative to an adjacent one of the front and rear wheel assemblies.

5. A wheelchair according to claim 1 wherein said drive means includes means for comparing the rotation of an element of the front wheel assembly with the rotation of an element of the rear wheel assembly and for adjusting said one of the wheel assemblies to an extent dependent on the difference between rotation of said element of the front wheel assembly and rotation of said element of the rear wheel assembly.

6. A wheelchair according to claim 1 further comprising guide means for guiding the control element for displacement along a predetermined path relative to the seat, a flexible drive element connected with the control element for drawing the control element along the guide means, a front rotatable element which rotates with the front spider and a rear rotatable element which rotates with the rear spider, wherein the flexible drive element extends around the front rotatable element and around the rear rotatable element in driving engagement therewith.

7. A vehicle comprising a load-carrying body, and front and rear wheel assemblies for supporting the body, wherein each said wheel assembly comprises a respective carrier and plurality of wheels rotatably mounted on the carrier, a control element which is movable relative to the body, drive means common to the front and rear wheel assemblies and the control element and a differential transmission for transmitting drive from the drive means to the front and rear wheel assemblies and the control element, wherein the control element is connected with one of said wheel assemblies for moving same upwardly and downwardly relative to the body when the control element itself is moved.

* * * * *